US008857979B1

(12) United States Patent
Rothman

(10) Patent No.: US 8,857,979 B1
(45) Date of Patent: Oct. 14, 2014

(54) EYEGLASSES WITH INTERCHANGEABLE FRAME ADORNMENTS

(71) Applicant: David S. Rothman, Parma, OH (US)

(72) Inventor: David S. Rothman, Parma, OH (US)

( * ) Notice: Subject to any disclaimer, the term of this patent is extended or adjusted under 35 U.S.C. 154(b) by 0 days.

(21) Appl. No.: 13/683,492

(22) Filed: Nov. 21, 2012

(51) Int. Cl.
G02C 11/02 (2006.01)
G02C 5/00 (2006.01)

(52) U.S. Cl.
CPC .............. G02C 11/02 (2013.01); G02C 5/001 (2013.01)
USPC .............................................. 351/52; 351/51

(58) Field of Classification Search
CPC .... G02C 11/02; G02C 2200/02; G02C 7/027; G02C 5/14; G02C 5/143
USPC ................. 351/51, 52, 41, 158, 121
See application file for complete search history.

(56) References Cited

U.S. PATENT DOCUMENTS

| 2,778,136 | A | * | 1/1957 | Belgard | 351/52 |
|---|---|---|---|---|---|
| 2,803,994 | A | * | 8/1957 | De Angelis et al. | 351/52 |
| 2,960,787 | A | * | 11/1960 | Quinones et al. | 351/52 |
| 4,245,896 | A | * | 1/1981 | Kaplan | 351/41 |
| 4,968,128 | A | | 11/1990 | Mendola | |
| 5,161,234 | A | | 11/1992 | Nitta | |
| 5,185,620 | A | | 2/1993 | Cooper | |
| 5,371,554 | A | | 12/1994 | Aspesi | |
| 5,583,584 | A | | 12/1996 | Friedman | |
| 5,794,459 | A | | 8/1998 | Ignatowski | |
| 6,863,394 | B1 | | 3/2005 | Nelson et al. | |
| 7,524,052 | B2 | * | 4/2009 | Esses | 351/52 |
| 7,588,331 | B2 | | 9/2009 | Burnstein | |

* cited by examiner

Primary Examiner — Hung Dang
(74) Attorney, Agent, or Firm — Robert C. Montgomery; Montgomery Patent & Design

(57) ABSTRACT

Eyeglasses with interchangeable frame adornments provide eyeglasses with a plurality of accessories including a plurality of fasteners having a decorative attachment. An outwardly disposed socket fastener is placed upon the frame of the eyeglasses; each of the attachments includes a decorative adornment with an integral stud fastener. The attachments are selectively interchangeable and configurable upon the frame of the eyeglasses by corresponding engagement of the stud fastener to the socket fastener.

11 Claims, 7 Drawing Sheets

EYEGLASSES WITH INTERCHANGEABLE FRAME ADORNMENTS

RELATED APPLICATIONS

Not applicable.

FIELD OF THE INVENTION

The present invention relates generally to eyeglasses, and in particular, to eyeglasses with interchangeable frame adornments.

BACKGROUND OF THE INVENTION

Anyone who wears eyeglasses can attest to their general annoyance. Aggravations such as frequent cleaning, slippage, breakage, and the like, push many people to wear contacts or undergo eye surgery to eliminate the burden of wearing glasses. However, many people can either not afford or are not physically able to utilize such alternatives. Additionally, many people, especially young children, find eyewear unattractive and do not want to wear them to avoid being ridiculed by other children.

Accordingly, there exists a need for a means by which eyeglasses can be modified or enhanced to increase their aesthetic appeal in an effort to address the abovementioned shortcomings. Therefore, despite any advances already in the field, those skilled in the art continue with research and development efforts directed to improving the aesthetic appeal and personalization of eyewear.

SUMMARY OF THE INVENTION

The inventor has recognized the aforementioned inherent problems and lack in the art and observed that there is a need for a device and method that allows for individualization, customization, and aesthetic enhancement of eyeglasses. The development of the present invention, which will be described in greater detail herein, substantially departs from conventional solutions to provide eyeglasses with interchangeable frame adornments and in doing so fulfills this need.

In one embodiment, the disclosed eyeglass adornment can include a frame having a pair of lenses, a nose piece, and a pair of temples, at least one (1) socket attached to the frame, at least one (1) stud removably attached to the socket, and an adornment attached to the stud.

In another embodiment, the disclosed eyeglass adornment can include a socket configured to be attached to a frame of eyeglasses, a stud removably attached to the socket, and an adornment attached to the stud.

In another embodiment, the disclosed eyeglass adornment can include a stud having a generally disk-shaped body including a flat front surface and a rear surface opposite the front surface and an insert protruding outwardly from the rear surface configured to insertably attach to the socket.

In another embodiment, the disclosed eyeglass can include a socket having a generally disk-shaped body including a rear surface attached to the frame and a front surface opposite the rear surface and a receiving aperture disposed though the front surface configured to receivably attach to the stud.

In another embodiment, the disclosed eyeglass can include a socket that is integrally molded into at least one (1) of the pair of temples of the frame.

In another embodiment, the disclosed eyeglass can include a socket having a body including a rear surface that is adhesively attached onto at least one (1) of the pair of temples of the frame.

In another embodiment, the disclosed eyeglass can include a socket having a body including a threaded circumferential edge, wherein the socket is threadably attached into at least one (1) of the pair of temples of the frame.

In another embodiment, disclosed is a method for adorning eyeglasses, the method can include the steps of: providing eyeglasses having a pair of lenses, a nose piece, and a pair of temples; providing at least one (1) eyeglass adornment including a socket, a stud, and an adornment attached to the stud; attaching the socket to at least one (1) of the pair of temples; and attaching the stud to the socket.

Furthermore, the described features and advantages of the disclosed thermal pocket can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
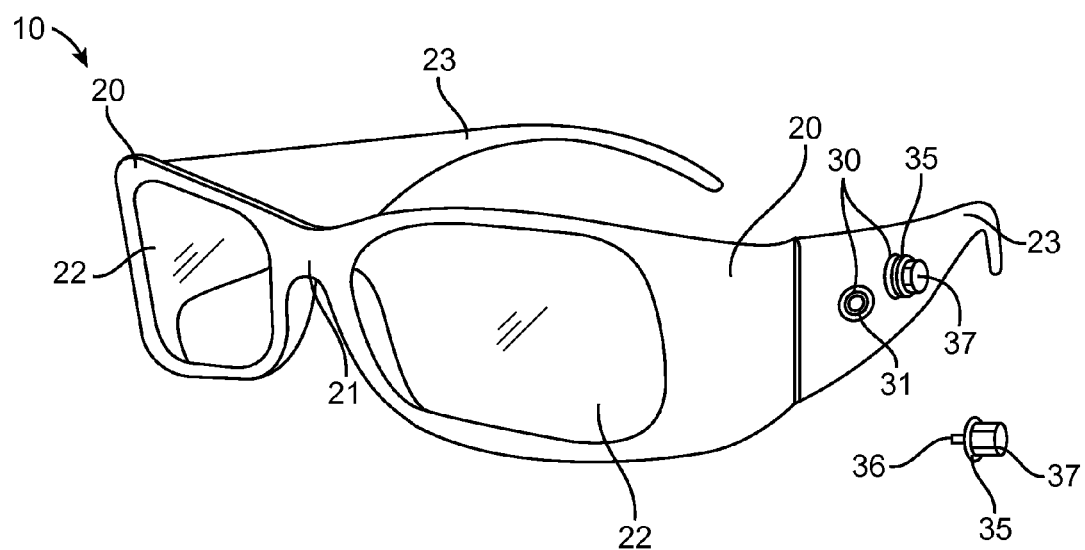
FIG. 1 is a front perspective view of one embodiment of eyeglasses with interchangeable frame adornments in accordance with the present invention.

DESCRIPTIVE KEY 10 eyeglasses with interchangeable frame adornments
20 frame
21 nose piece
22 lens
23 temple
24 hinge
30 socket
31 receiving aperture
35 stud
36 insert 37 first adornment
38 second adornment
40 first alternate embodiment
41 eyeglasses
42 first alternate socket
43 first alternate receiving aperture
44 backing
45 adhesive surface
50 second alternate embodiment
51 drilled aperture
52 second alternate socket
53 second alternate receiving aperture
54 threaded perimeter edge

DETAILED DESCRIPTION OF THE PREFERRED EMBODIMENT

In accordance with the invention, the best mode is presented in terms of the described embodiments, herein depicted within FIGS. 1 through 10. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 10, disclosing eyeglasses with interchangeable frame adornments (herein generally described as a "device") 10, where like reference numerals represent similar or like parts. In accordance with the invention, the present disclosure describes a device 10 which provides for enhancing the overall appearance of a pair of eyeglasses.

Figure 2:
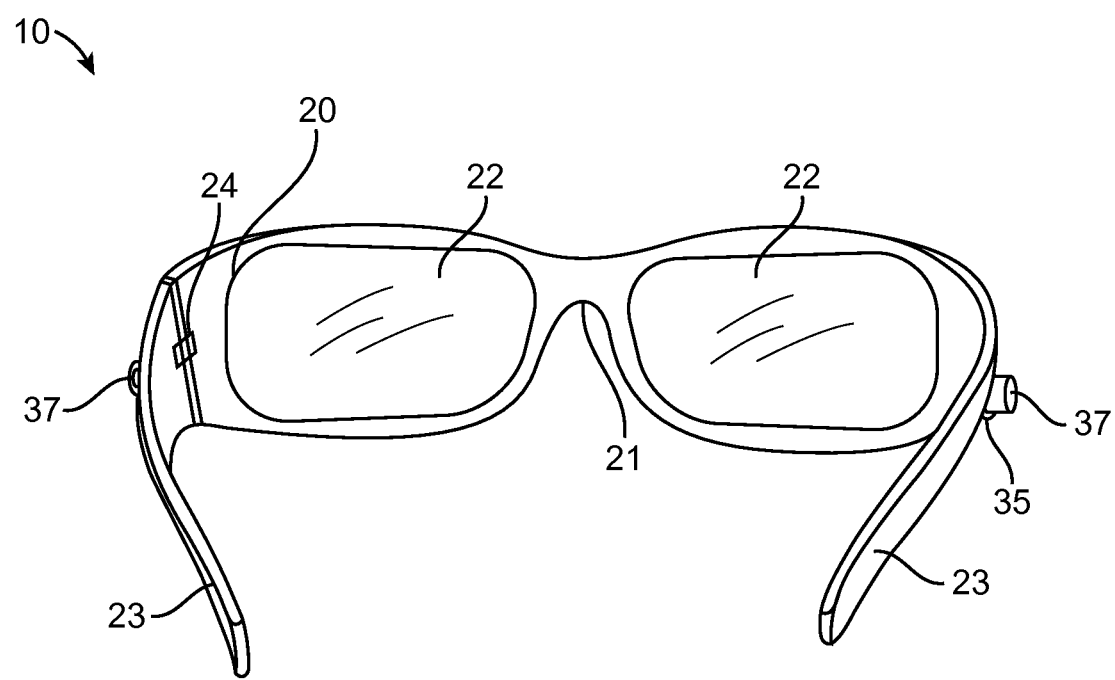
FIG. 2 is a rear perspective view of the eyeglasses with interchangeable frame adornments of FIG. 1.
Figure 3:
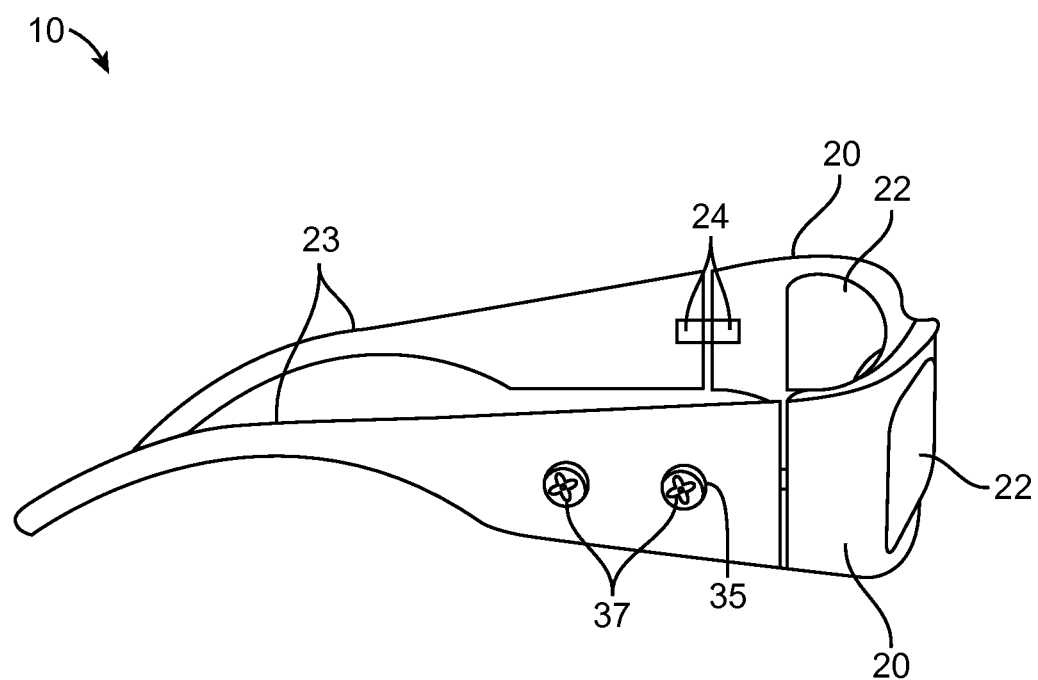
FIG. 3 is a side perspective view of the eyeglasses with interchangeable frame adornments of FIG. 1.

Referring first to FIGS. 1 through 3, the device 10 can include a frame 20, which is common in eyeglasses such as reading glasses, sunglasses, or the like. The frame 20 can include a nose piece 21 at an intermediate location to suppose the device 10 upon the bridge of the user's nose. The nose piece 21 is depicted as being arcuate in shape to correspond to the shape of the user's nose. The frame 20 enables a pair of lenses 22 to be positioned over the eyes of a user. The lenses 22 can be prescription or non-prescription lenses, which can be tinted or non-tinted, also common to eyeglasses on the market today. The frame 20 also enables attachment of a pair of opposing and perpendicular temples 23. The temples 23 are supported upon the user, typically behind the ears. The temples 23 can be attached to opposing side perimeter edges of the frame 20 by hinges 24, which also enable the temples 23 to pivot inwardly for storage. The frame 20, nose piece 21, and temples 23 can include various shapes and can be preferably fabricated from materials such as plastic, metal, or the like.

The device 10 can include a socket 30, a stud 35 and an adornment 37, which are preferably positioned and attached upon the temples 23, yet other locations can be utilized without limiting the scope of present disclosure. Although the device 10 is depicted as having a pair of sockets 30, studs 35 and adornments 37, it can be appreciated that any number of sockets 30, studs 35 and adornments 37 can be attached to the temples 23 without limiting the scope of the present disclosure.

The socket 30 can be disc-shaped and can include a centrally located receiving aperture 31 upon a front surface. The socket 30 can be fabricated from materials such as, but not limited to: plastic, metal, or the like and can be integrally molded into the temples 23 during manufacturing. The receiving aperture 31 securely receives the stud 35.

Figure 4:
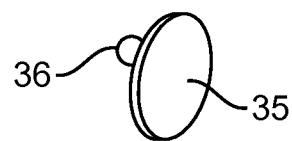
FIG. 4 is a front perspective view of an attachable stud of the eyeglasses with interchangeable frame adornments.
Figure 5:
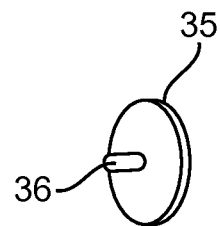
FIG. 5 is a rear perspective view of the stud of FIG. 4.
Figure 6:
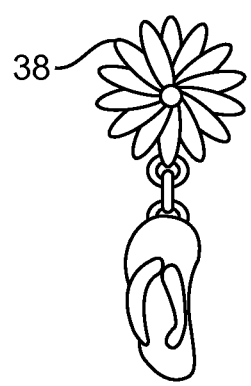
FIG. 6 is a front view of an attachable adornment of the eyeglasses with interchangeable frame adornments.

Referring next to FIGS. 4 through 6, the stud 35 can be disc-shaped and can include a protruding insert 36 upon a rear surface for insertion into the receiving aperture 31 of the socket 30 (FIG. 1). The stud 35 can be fabricated from materials such as, but not limited to: plastic, metal, or the like. The insert 36 can be slightly smaller than the receiving aperture 31 to enable a friction-type fit. A front surface of the stud 35 can be utilized to place various adornments 37. A first adornment 37 is depicted in FIG. 1 and is illustrated as a diamond or jewel and a second adornment 38 is depicted in FIG. 6 and is illustrated as a flower having a suspended shoe. It can be appreciated by one skilled in the art that the adornments 37, 38 can have various ornamental appearances and can be utilized without limiting the scope of the present disclosure.

Figure 7:
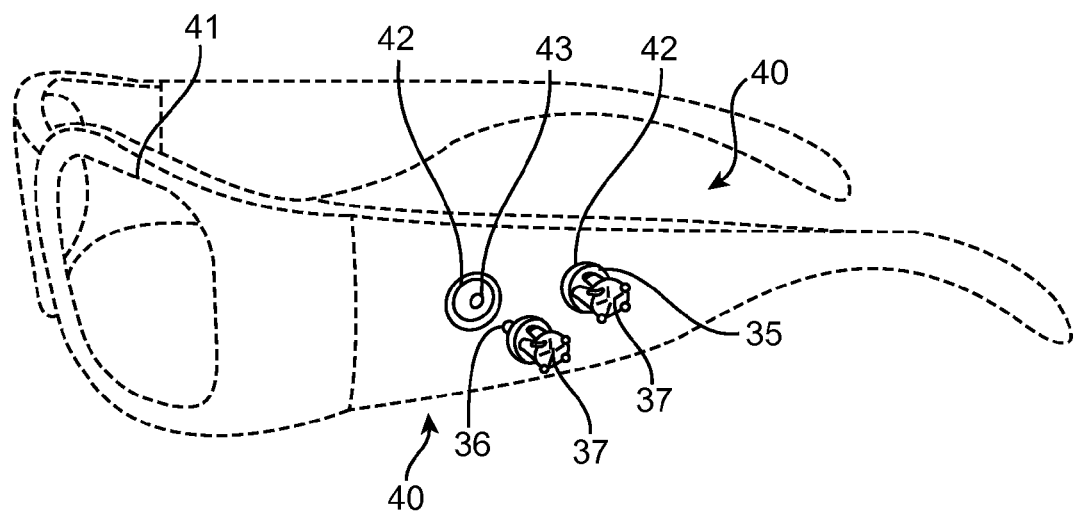
FIG. 7 is an environmental view of a another embodiment of the eyeglasses with interchangeable frame adornments in accordance with the present invention.
Figure 8:
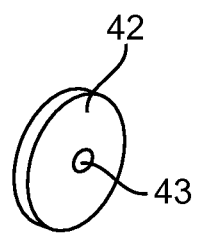
FIG. 8 is a front perspective view of a socket of the eyeglasses with interchangeable frame adornments of FIG. 7.
Figure 9:
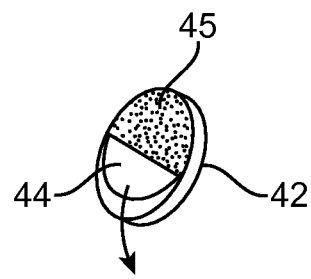
FIG. 9 is a rear perspective view of the socket of FIG. 8.

Referring now to FIGS. 7 through 9, depicting another embodiment of the eyeglasses with interchangeable frame adornments (herein generally described as a "first alternate embodiment") 40, which enables a user to enhance an existing pair of eyeglasses 41. The first alternate embodiment 40 can include a first alternate socket 42 which can be placed upon a desired surface of the eyeglasses 41. The first alternate socket 42 enables the stud 35 (as described above in FIGS. 4 and 5) to be inserted as abovementioned. The first alternate socket 42 can include a disc-shape and also includes a first alternate receiving aperture 43 (FIG. 8) upon an intermediate location for insertion of the insert 36 of the stud 35. The first alternate socket 42 can also include an adhesive surface 45 (FIG. 9) upon a rear side for adhesive attachment to a surface of the eyeglasses 11. Preferably a removable wax backing 44 can cover the adhesive surface 45 until it is to be placed upon the eyeglasses 41 to maintain its tackiness.

Figure 10:
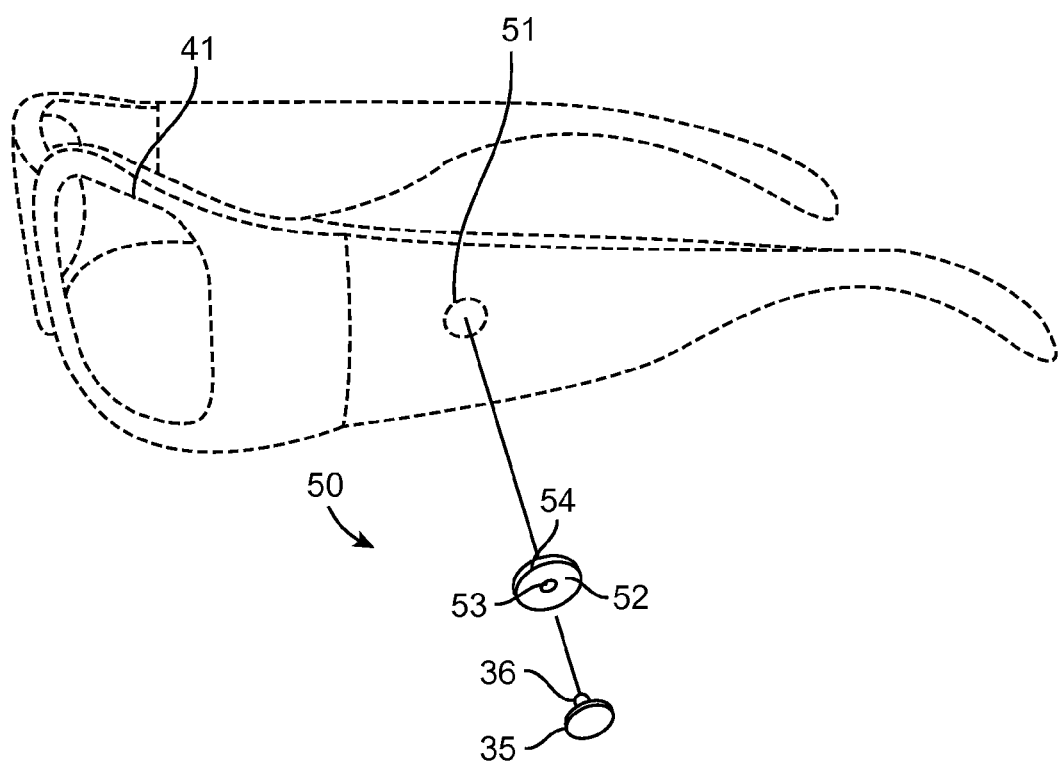
FIG. 10 is an environmental view of another embodiment of the eyeglasses with interchangeable frame adornments in accordance with the present invention.

Referring lastly to FIG. 10, disclosing another embodiment of the eyeglasses with interchangeable frame adornments (herein generally described as a "second alternate embodiment") 50. The second alternate embodiment 50 enables a user to enhance an existing pair of eyeglasses 41. The second alternate embodiment 50 can include a second alternate socket 52, which enables the stud 35 to be fastened to the eyeglasses 41. The second alternate socket 52 can be disc-shaped and can include a second alternate receiving aperture 41 to securely receive the insert 36 of the stud 35. The second alternate socket 52 can also include a threaded perimeter edge 54. In use, the eyeglasses 41 can be modified by drilling a threaded, i.e., tapped, drilled aperture 51. The threaded perimeter edge 54 can engage the drilled aperture 51 to affix the second alternate socket 52 to the eyeglasses 41 within the drilled aperture 51. The second alternate socket 52 can be fabricated from materials such as, but not limited to: plastic, metal, or the like.

In accordance with the described embodiments, the device 10 can be utilized by the user in a simple and effortless manner with little or no training. It is envisioned that the device 10 can be constructed in general accordance with FIGS. 1-10. After initial purchase or acquisition of the device 10, it can be utilized as indicated in FIGS. 1-3, 7, and 10.

The method of utilizing the device 10 may be achieved by performing the following steps: acquiring the device 10; inserting a desired stud 35 onto the socket 30 by engaging the insert 36 to the receiving aperture 31; donning the device 10 so that the lenses 22 cover the users eyes and the temples 23 are placed above the ears of the user; replacing the studs 35 as desired; and, enhancing eyeglasses 11 in a manner which is quick and effective.

The method of utilizing the first alternate embodiment 40 with existing eyeglasses 41 may be achieved by performing the following steps: acquiring eyeglasses 41; removing the backing 44 from the first alternate socket 42; applying the first alternate socket 42 to a desired surface upon the eyeglasses 41; attaching the stud 30 with the first alternate socket 42 by engaging the insert 36 within the first alternate receiving aperture 43; and, enhancing the existing eyeglasses 41 in a manner which is quick and effective.

The method of utilizing the second alternate embodiment 50 with existing eyeglasses 41 may be achieved by performing the following steps: acquiring eyeglasses 41; creating a drilled and tapped aperture 51 in the eyeglasses 41; threadably engaging the second alternate socket 52 within the drilled aperture 51; attaching the stud 35 with the second alternate socket 52 by engaging the insert 36 within the second alternate receiving aperture 53; and enhancing existing eyeglasses 41 in a manner which is quick and effective.

The foregoing embodiments of the disclosed eyeglasses with interchangeable frame adornments have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments of the disclosed baluster bracket assembly shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. An adornment for eyeglasses including a frame having a pair of lenses, a nose piece, and a pair of temples, said adornment comprising:
   a socket attachable to said frame, said socket comprising:
      a socket body comprising a front surface and an opposed rear surface, said front surface being spaced away from said rear surface to define a thickness of said socket body, and said rear surface is adhesively attached to a surface of said frame; and,
      an aperture disposed in said front surface and extending toward said rear surface;
   a stud removably attached to said socket, said stud comprising:
      a stud body comprising a front surface and a rear surface; and,
      an insert protruding perpendicularly outward from said rear surface of said stud body, said insert being removably received by said aperture, and said insert comprising a length less than said thickness of said socket body; and,
   an adornment attached to said stud.

2. The adornment of claim 1, wherein said stud body comprises
   a generally disk-shaped body, and wherein said front surface and said rear surface of said stud body are flat.

3. The adornment of claim 1, wherein said adornment is removably attached to said front surface of said stud body.

4. The adornment of claim 1, wherein said socket body comprises
   a generally disk-shaped body, and wherein said front surface of said socket body is flat.

5. The adornment of claim 4, wherein said stud body comprises
   a generally disk-shaped, and wherein said front surface and said rear surface of said stud body are flat.

6. The adornment of claim 5, wherein said adornment is removably attached to said front surface of said stud body.

7. The adornment of claim 1, wherein said rear surface of said socket body is adhesively attached onto at least one of said pair of temples of said frame.

8. An adornment for eyeglasses including a frame having a pair of lenses, a nose piece, and a pair of temples, said adornment comprising:
   a socket attachable to said frame, said socket comprising:
      a socket body comprising a front surface, an opposed rear surface, and a threaded exterior circumferential surface extending between said front surface and said rear surface, said front surface being spaced away from said rear surface to define a thickness of said socket body, and said threaded exterior circumferential surface is threadably attached to a surface of said frame; and,
      an aperture disposed in said front surface and extending toward said rear surface;
   a stud removably attached to said socket, said stud comprising:
      a stud body comprising a front surface and a rear surface; and,
      an insert protruding perpendicularly outward from said rear surface of said stud body, said insert being removably received by said aperture, and said insert comprising a length less than said thickness of said socket body; and,
   an adornment attached to said stud.

9. The adornment of claim 8, wherein said socket body comprises
- a generally disk-shaped body, and wherein said front surface of said socket body is flat.

10. The adornment of claim 9, wherein said stud body comprises
- a generally disk-shaped body, and wherein said front surface and said rear surface of said stud body are flat.

11. The adornment of claim 10, wherein said adornment is removably attached to said front surface of said stud body.

* * * * *